(12) United States Patent
Ohran

(10) Patent No.: US 8,215,053 B1
(45) Date of Patent: Jul. 10, 2012

(54) METHOD FOR IMPROVING SEED GERMINATION EFFICIENCY

(75) Inventor: Richard Ohran, Provo, UT (US)

(73) Assignee: Richard Ohran, Provo, UT (US)

( * ) Notice: Subject to any disclaimer, the term of this patent is extended or adjusted under 35 U.S.C. 154(b) by 0 days.

(21) Appl. No.: 12/891,617

(22) Filed: Sep. 27, 2010

(51) Int. Cl.
*A01G 13/02* (2006.01)

(52) U.S. Cl. .................. 47/2; 47/20.1; 47/32.3

(58) Field of Classification Search ............ 47/2, 20.1, 47/29.1–29.3, 29.5, 32.3, 58.1 R, 32, 56, 47/58.1 SC, 58.1 SE
See application file for complete search history.

(56) References Cited

U.S. PATENT DOCUMENTS

| | | | | |
|---|---|---|---|---|
| 1,372,997 | A * | 3/1921 | Eckart | 47/9 |
| 1,695,942 | A * | 12/1928 | Atwater | 47/58.1 R |
| 2,256,414 | A * | 9/1941 | Stahl | 47/29.2 |
| 2,773,331 | A * | 12/1956 | Hughes | 47/58.1 R |
| 2,817,956 | A * | 12/1957 | Young | 405/45 |
| 3,160,986 | A * | 12/1964 | Watson et al. | 47/56 |
| 3,252,251 | A * | 5/1966 | Simmous | 47/29.1 |
| 3,384,993 | A * | 5/1968 | Kane | 47/58.1 R |
| 3,863,388 | A * | 2/1975 | Loads | 47/56 |
| 4,071,974 | A * | 2/1978 | Tripp, Jr. | 47/2 |
| 4,137,667 | A * | 2/1979 | Wallace et al. | 47/29.2 |
| 4,856,228 | A * | 8/1989 | Robinson, Sr. | 47/29.1 |
| 4,930,252 | A * | 6/1990 | Krause et al. | 47/40.5 |
| 5,117,580 | A * | 6/1992 | Brown | 47/9 |
| 7,207,136 | B2 | 4/2007 | Hinsperger | |

FOREIGN PATENT DOCUMENTS

JP 56020233 A * 2/1981

* cited by examiner

*Primary Examiner* — David Parsley
*Assistant Examiner* — Danielle Clerkley
(74) *Attorney, Agent, or Firm* — Workman Nydegger

(57) ABSTRACT

A method for improving seed germination efficiency by reducing seedling loss caused by desiccation, temperature extremes, wind and water displacement, and consumption by animal and insect predators. The method comprises covering the medium for the seed growth with a layer of material which allows light transmission and provides a thermal barrier, and in addition applies a compacting force which brings the seed in better contact with the growing medium. The material also provides a barrier to protect the seed from animal and insect predators. The layer of material used preferably consists of a clear plastic membrane supporting the presence of a sufficient amount of water to allow the transmission of light, provide a thermal barrier, compact the seeds to the growing medium, and deter access from animals and airborne insects. The technique is applicable to all forms and seed germination including grass and vegetable gardens.

19 Claims, 3 Drawing Sheets

METHOD FOR IMPROVING SEED GERMINATION EFFICIENCY

BACKGROUND OF THE INVENTION

1. The Field of the Invention

The present disclosure is generally related to methods for growing crops. In particular, the present disclosure relates to a method for increasing seed germination efficiency by employing a translucent membrane in contact with a growing medium and seeds which is covered with a layer of water which provides a thermal barrier and physical protection for the seeds.

2. Background and Relevant Art

Preventing seeded crop loss has been a concern since men first started tilling the soil and planting crops. In more recent history, the Indians of New England were given credit for saving the Pilgrims by teaching them how to make crops survive in the barren New England soil through burying a dead fish with each seed.

Many methods and devices have been conceived for protecting plants from desiccation, frost, wind, and predators. Many prior-art attempts have involved the employment of plastic films in some manner or another to address these problems and achieve better crop yields.

It has been recognized for centuries that an essential prerequisite to successful seed germination lies in placing the seed in close proximity to a moisture retaining growing medium. Standard practice in growing a crop from seeds includes tilling the soil to break it up into a medium in which the seed can be immersed and held in place by the weight of the soil above the seed. To insure that the soil retains moisture adequately, sometimes a material, such as organic mulch, is spread on top of the soil to further enhance the chance of success for a seed's germination.

Such methods are very time consuming, require expensive equipment, and only provide minimal protection from predators, such as birds, who are not deterred by a shallow covering of soil over the seeds. Additionally, using soil as a barrier from frost and desiccation only provides nominal protection because of its minimal thermal insulation properties and moisture retaining ability.

Some prior-art attempts at improving germination efficiency have suggested using a translucent membrane to provide protection to the seeds from wind and predators. Such attempts generally result in failure due to the inability to prevent seedling death due to desiccation and heat buildup. This shortcoming in the use of plastic film has been addressed in other patents, such U.S. Pat. No. 7,207,136, which discloses altering the film to make it permeable, thereby allowing for the passage of water and air. Such methods suffer from the disadvantage that the seeds remain vulnerable to damage caused by thermal extremes.

The present invention provides unique and improved methods for improving crop yields. The method of the present invention improves seed germination efficiency and protects crops from predator consumption, desiccation, wind, and frost while overcoming the deficiencies of prior-art methods.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the description. These and other objects and features of the present invention will become more fully apparent from the following description, or may be learned by the practice of the invention as set forth hereinafter.

BRIEF SUMMARY OF THE INVENTION

The present invention provides methods for employing a layer of film in contact with a growing medium and seeds, and then augmenting it with a layer of water over the film. The layer of water is not used as a nutrient to the seed, but rather as a protection from thermal extremes, as a compaction force which brings the seed into contact with the growing medium, and as a deterrent to physical and animal events which would otherwise be deleterious to the germinating seed.

The problems of desiccation and heat buildup can be better controlled by maintaining a layer of water over an impermeable translucent film. Even though the film is not permeable to water, desiccation is no longer a problem because the film traps ground vapors and reduces evaporation created by air exposure. The layer of water over the film prevents heat buildup in the soil, thereby reducing drying caused by heat.

Conventional techniques of agriculture involve tilling the soil to break it up so that the seed can be placed below the surface of the soil. This has the advantage of reducing seed loss from predators, placing the seed in a location with a greater supply of moisture, and providing a compaction force which brings the seed into the necessary close contact to the growing medium. The present invention eliminates the need for this effort. It is, in fact, not necessary to till the soil and sow the seed to any particular depth. The seed can be simply scattered across the surface of the growing medium, and then the weight of the plastic film and the water will keep the seed sufficiently pressed into the soil that the seed will root and sprout successfully. This is not to say that the technique will not work with the standard practices of tilling and mulching.

The method of this invention addresses the problems of excessive heat as well as that of cold. A seedling exposed to high temperatures can protect itself as long as it can transpire moisture from the growing medium through its leaves. When the growing medium dries out, then the temperature of the plant rises, proteins congeal, and the plant dies from desiccation. By employing the method of this invention, the heat of the afternoon sun has little effect on the seedling because the layer of water over the plastic membrane rises in temperature slowly in comparison to the rise in temperature experienced in uncovered soil. Even if this method is employed in an extremely hot climate, adequate thermal protection for plants can still be achieved by increasing the depth of the water layer.

Physical protection from the elements and animals is an important aspect of the method in this invention. A heavy spring rainfall can devastate a newly planted lawn. Likewise, a windstorm can displace seeds from their intended location. Birds and insects feast on newly seeded ground. The present invention provides a protective covering against rainfall, winds and also provides substantial barriers to birds and insects that would otherwise would prey on the seeds.

The mechanism of maintaining a pool of water over a layer of translucent membrane described in the method of this patent is easily solved by building small earth berms underneath the edge of the membrane, or even by the use of pieces of wood or other materials such as sprinkler pipe to contour the membrane into a pool shape. For smaller areas of reseeding it is even practical to employ water contained in a clear plastic container such as a storage box, or even something so small as a milk container of water placed directly over a seed.

DETAILED DESCRIPTION OF THE PREFERRED EMBODIMENTS

Figure 1:
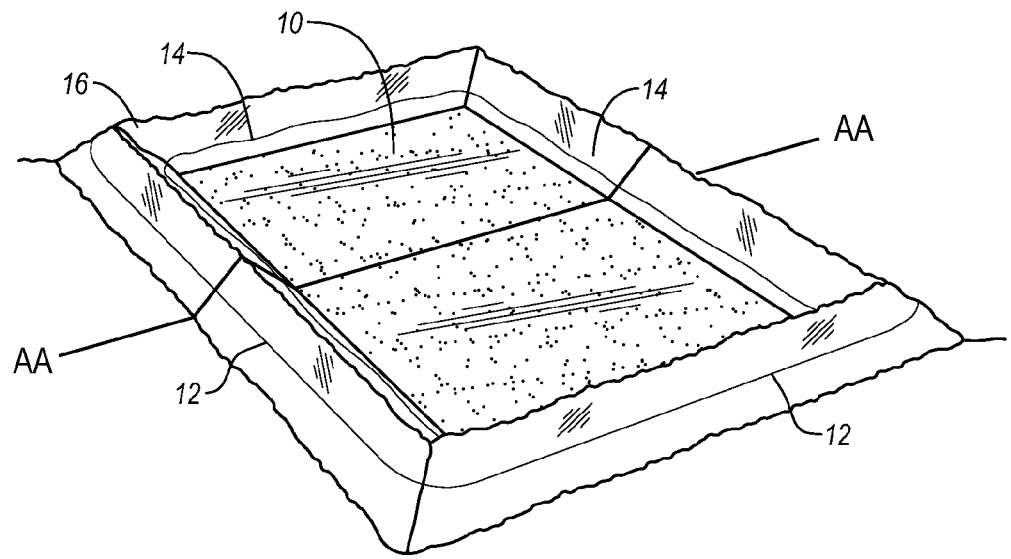
FIG. 1 is a perspective view of a seeded growing medium covered with an impermeable translucent membrane and a layer of water prepared according to the method of the invention.
Figure 2:
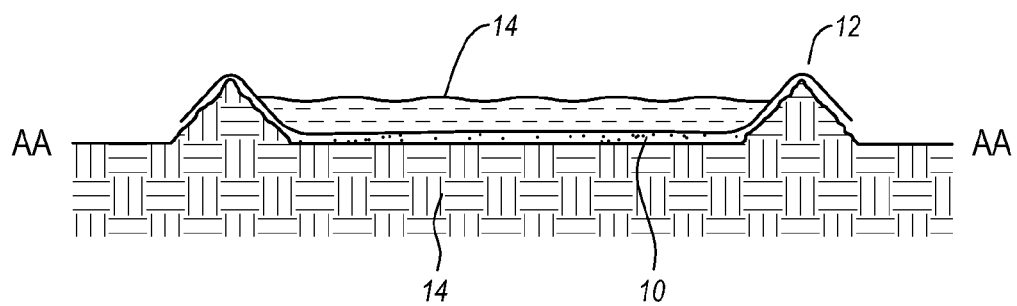
FIG. 2 is a cross-sectional view taken along line 2-2 of FIG. 1.

Reference is now made to the Figures wherein like parts are referred to by like numerals throughout. The present invention provides improved methods for enhancing crop growth. Such enhancements include increasing seed germination efficiency and reducing risks to plants in early growth. With reference to FIG. 1, the method of the present invention is achieved by initially preparing a seeded growing medium 10.

Seeded growing medium 10 may be prepared by cultivating the ground and applying mulch, sawdust or other additives as is conventionally known in the art. While mulch is normally essential in a normal planting, with the method of the present invention, it is entirely unnecessary.

In accordance with the method of the present invention, seed may be either mixed into a top layer of the soil or simply scattered on the surface of the soil.

In a presently preferred method, the seeded growing medium 10 is prepared by first sterilizing a plot of soil with a non-permanent herbicide and, after a sufficient time period appropriate to the method of soil sterilization, scattering seed over the surface of the soil. The dead herbage may first be removed or left to mix with the soil as mulch. If the dead herbage is substantial enough to prevent the film from pressing the seeds into contact with the soil, then it is better removed because seeds need contact to a moisture bearing medium in order to germinate.

Regardless of whether the seed is scattered over the surface of the soil or mixed into a top layer of the soil, it is preferred that the surface of the growing medium be substantially level; thus, conventional methods may be employed to achieve a substantial level surface before applying the seed in or on the soil.

The seeded growing medium 10 is then covered with a water impermeable covering. It is presently preferred that the water impermeable covering be a flexible, translucent film such as a layer of polyethylene film 12. In some applications, however, a rigid water impermeable covering may be utilized, such as a clear plastic a storage box or even something as small as a plastic milk container.

With the water impermeable covering in place, a layer of water 14 is provided over the covering. The layer of water is preferably approximately the same depth across the entire surface of the seeded growing medium 10. The depth of the layer of water 14 should be sufficient to provide a thermal barrier against heat and cold; thus, it will be appreciated that the thickness of the layer of water will vary according to the growing climate and the ambient temperatures that are anticipated. One of the benefits of this method is that the seedling will root even if it lies upon the surface of the soil because of the compaction force exerted upon it by the weight of the water. Consequently, the layer of water 14 should be sufficient to apply enough force to the impermeable covering to maintain the seeds in contact with the surface of the soil.

Figure 3:
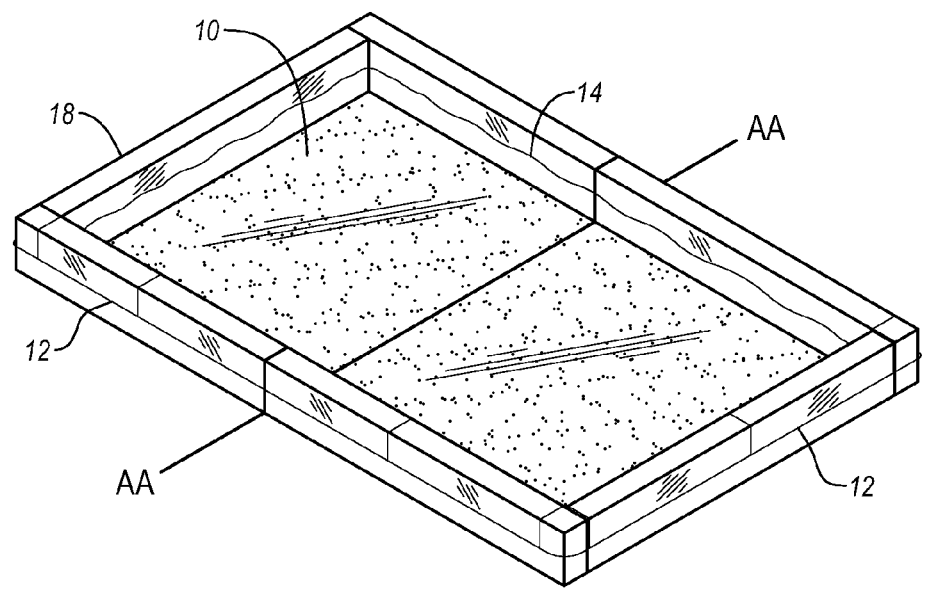
FIG. 3 is a perspective view of a lumber supporting structure surrounding the seeded growing medium for contouring outer edges of the water impermeable covering upwards to retain the layer of water over the seeded growing medium according to a preferred method of the present invention.

A supporting structure is provided surrounding the seeded growing medium 10 for contouring the outer edges of the film 12 upwards to retain the layer of water 14 over the seeded growing medium. In accordance with a presently preferred method of the invention, the supporting structure is a soil berm 16. Alternatively, the supporting structure may be constructed of lumber 18, as illustrated in FIG. 3. Another alternative for the supporting structure is to fashion one of plastic pipe. One of skill in the art will be able to readily identify a variety of materials to use to construct the supporting structure, depending on the materials that are readily available for this purpose.

It is important to maintain an adequate layer of water over the plastic at all times. If the water evaporates, or leaks away, the protection from thermal extremes is lost and the germinating seedlings are subject to death by heat buildup or freezing. The simplest way to control the level of water is to monitor it daily and add water manually as needed. If this cannot be done, then a water level control system is preferably utilized. In accordance with the teachings of the present invention, a presently preferred water level control system includes a water level sensor in communication with a water source. The water level control system is configured such that when the water level sensor detects that the water level of the layer of water 14 has dropped below a predetermined level, water is dispensed from the water source into the layer of water to keep the layer of water to a predetermined depth. Of course, such sensors also detect a predetermined maximum water level signaling when to discontinue the flow of water from the external source and into the layer of water.

Figure 4:
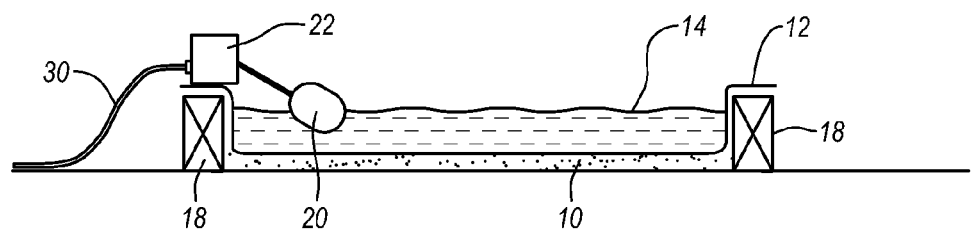
FIG. 4 is a cross-section view taken along line 4-4 of FIG. 3, additionally illustrating the use of a mechanical float and valve arrangement to automatically maintain water level.

In a preferred embodiment as illustrated in FIG. 4, the water level control system utilizes a mechanical float 20 in mechanical communication with a valve 22 which receives a source of water through a pipe 24, as is well known in the plumbing arts.

Figure 5:
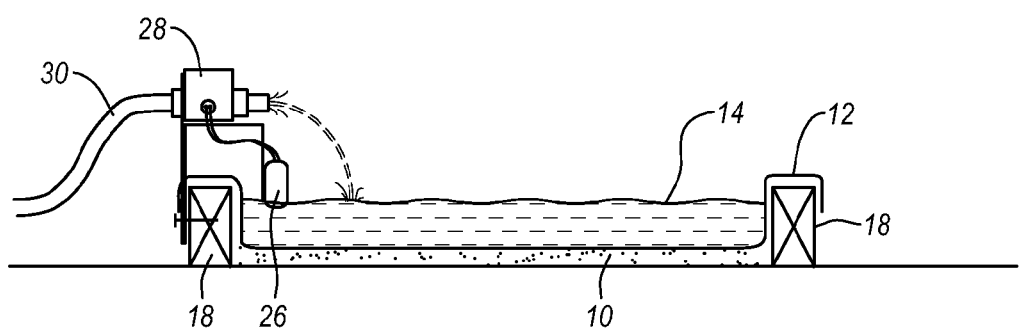
FIG. 5 illustrates the use of a similar device for maintaining the depth of the layer of water using an electronic sensor with an electronic control valve to refill the water as necessary.

An alternative water level control system may include an electrical sensor 26, as illustrated in FIG. 5, electrically coupled to an electrically controlled valve 28 which, when opened, dispenses water from the water source into the layer of water.

In more complex embodiments of the method of the invention, a network of tubes 30 may be provided under the impermeable covering through which air and water can be ducted from outside the water impermeable covering to the seeded growing medium.

The film and pool of water is maintained as described for a period of time appropriate to the complete germination of the type of seed and, preferably, to allow the new plant to begin to grow. For example, for ordinary lawn grass in a northern climate, this could be as much as three weeks. At the time of removal of the film and layer of water, the grass seedlings will have typically developed to a length of one inch or more. After the film and pool of water have been removed, the lawn is watered and fertilized as any other lawn.

It should be appreciated that the methods of the present invention are capable of being incorporated in a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description.

I claim:

1. A method for enhancing crop growth comprising:
   covering a seeded growing medium with a water impermeable covering wherein the water impermeable covering is in direct contact with a substantially seeded portion of the seeded growing medium;
   covering said water impermeable covering with a layer of water; and
   removing the water impermeable covering and the layer of water after the seed has germinated.

2. A method for enhancing crop growth as defined in claim 1, wherein the step of covering a seeded growing medium with a water impermeable covering is preceded by the step of preparing the seeded growing medium.

3. A method for enhancing crop growth as defined in claim 2, wherein the step of covering of preparing the seeded growing medium comprises the step of scattering seeds on top of a plot of soil.

4. A method for enhancing crop growth as defined in claim 1, wherein the step of covering a seeded growing medium with a water impermeable covering comprises covering a seeded growing medium with a flexible film.

5. A method for enhancing crop growth as defined in claim 1, wherein the step of covering a seeded growing medium with a water impermeable covering comprises covering a seeded growing medium with a water impermeable, translucent covering.

6. A method for enhancing crop growth as defined in claim 1, wherein the step of covering a seeded growing medium with a water impermeable covering comprises covering a seeded growing medium with a translucent water impermeable, rigid covering.

7. A method for enhancing crop growth as defined in claim 1, wherein the step of covering said water impermeable covering with a layer of water comprises the step of covering said water impermeable covering with a layer of water that is of approximately the same depth across the entire surface of the seeded growing medium.

8. A method for enhancing crop growth as defined in claim 1, wherein the step of covering said water impermeable covering with a layer of water comprises the step of covering said water impermeable covering with a layer of water that is of sufficient depth to provide a thermal barrier against anticipated ambient temperatures.

9. A method for enhancing crop growth as defined in claim 1, further comprising the step of providing a supporting structure surrounding the seeded growing medium for contouring outer edges of the water impermeable covering upwards to retain the layer of water over the seeded growing medium.

10. A method for enhancing crop growth as defined in claim 1, further comprising the step of providing a water level control system including a water level sensor in communication with a water source, said water level control system configured such that when the water level sensor detects that the water level of the layer of water has dropped below a predetermined level, water is dispensed from the water source into the layer of water.

11. A method for enhancing crop growth comprising:
    preparing the seeded growing medium;
    covering the seeded growing medium with a water impermeable, translucent, flexible film wherein the water impermeable covering is in direct contact with a substantially seeded portion of the seeded growing medium;
    covering the film with a layer of water that is of sufficient depth to provide a thermal barrier against anticipated ambient temperatures;
    providing a supporting structure surrounding the seeded growing medium for contouring the outer edges of the film upwards to retain the layer of water over the seeded growing medium; and
    removing the film and the layer of water after the seed has germinated.

12. A method for enhancing crop growth as defined in claim 11, wherein the step of preparing the seeded growing medium comprises the step of sterilizing a plot of soil with a non-permanent herbicide.

13. A method for enhancing crop growth as defined in claim 11, wherein the step of preparing the seeded growing medium comprises the step of cultivating a plot of soil and mixing seeds into a top layer of the plot of soil.

14. A method for enhancing crop growth as defined in claim 11, wherein the step of preparing the seeded growing medium comprises the step of preparing a plot of soil such that it is substantially flat.

15. A method for enhancing crop growth as defined in claim 11, wherein the step of preparing the seeded growing medium comprises the step of scattering seeds on top of a plot of soil.

16. A method for enhancing crop growth as defined in claim 11, wherein the step of providing a supporting structure surrounding the seeded growing medium for contouring outer edges of the film upwards comprises the step of selecting a supporting structure from the group consisting of soil berms, lumber and plastic pipe.

17. A method for enhancing crop growth as defined in claim 11, further comprising the step of providing a water level control system including a water level sensor in communication with a water source, the water level control system configured such that when the water level sensor detects that the water level of the layer of water has dropped below a predetermined level, water is dispensed from the water source into the layer of water.

18. A method for enhancing crop growth as defined in claim 17, wherein the step of providing a water level control system including a water level sensor comprises providing a mechanical float in mechanical communication with a valve which, when opened, dispenses water from the water source into the layer of water.

19. A method for enhancing crop growth as defined in claim 17, wherein the step of providing a water level control system including a water level sensor comprises providing an electrical sensor and an electrically controlled valve which, when opened, dispenses water from the water source into the layer of water.

* * * * *